United States Patent
Youmans

[15] 3,706,884
[45] Dec. 19, 1972

[54] PULSED NEUTRON WELL LOGGING APPARATUS HAVING FOR DETERMING BACKGROUND RADIATION

[72] Inventor: Arthur H. Youmans, Houston, Tex.
[73] Assignee: Dresser Industries, Inc., Dallas, Tex.
[22] Filed: June 30, 1967
[21] Appl. No.: 650,442

[52] U.S. Cl. .......................250/83.3 R, 250/83.6 W
[51] Int. Cl. .................................................G01v 5/00
[58] Field of Search ........250/83.3, 83.6 W, 83.6 DS, 250/83.1, 83.3 R

[56] References Cited
UNITED STATES PATENTS
3,566,116  2/1971  Nelligan.........................250/836 UX

OTHER PUBLICATIONS
Youmens et al., Neutron Lifetime A New Nuclear Log, Oct. 1963 publisher Lane Wells Co.

Primary Examiner—Archie R. Borchelt
Attorney—Robert W. Mayer, Daniel Rubin, Peter J. Murphy, Douglas M. Clarkson, Roy L. Van Winkle and William E. Johnson, Jr.

[57] ABSTRACT

Three gates provide means for eliminating the radiation background count in pulsed neutron well logging. Circuitry provides the determination of the extrapolated counting rate at time zero.

5 Claims, 9 Drawing Figures

ARTHUR H. YOUMANS
INVENTOR.

BY William E. Johnson Jr.
ATTORNEY

ARTHUR H. YOUMANS
INVENTOR.

BY William E. Johnson Jr
ATTORNEY.

ARTHUR H. YOUMANS
INVENTOR.

BY William E. Johnson Jr.
ATTORNEY.

PULSED NEUTRON WELL LOGGING APPARATUS HAVING FOR DETERMING BACKGROUND RADIATION

BACKGROUND OF THE INVENTION

This invention relates to the art of geophysical prospecting in general and to the art of radioactivity well logging in particular and more particularly to improvements in such logging wherein the lifetime of neutrons in the formation is measured.

Radioactivity well logging is conventionally of three sorts, natural gamma ray logging, gamma ray-gamma ray logging, and neutron logging. Neutron well logging is conventionally performed by traversing a well with a radium-beryllium source of energetic neutrons, thereby continuously irradiating the formations penetrated by the well with fast neutrons, and simultaneously measuring and recording the number of neutrons or gamma rays returning to the well from the formations as a result of such irradiation.

An improvement in neutron well logging as shown in the prior art utilizes a periodically varying neutron source whereby the neutron irradiation of the formations is periodically cut off. Such a source may comprise a system employing a material emitting alpha particles with a disk rotating beside it having alternate sectors made of material which emits neutrons when exposed to alpha particles. The disk is rotated to turn the neutron source off and on at an audio frequency. A continuously operating detector detects secondary radiation emitted from the formations as a result of the radiations, and the audio-frequency component in the detection signal is amplified and recorded to the exclusion of any constant detection signal related to the natural gamma radiation. In the instant invention, not only the neutron source but also the detecting system is periodically varied.

It is known in the prior art to irradiate the formations for a period of time sufficient to activate an appreciable number of nuclei of material in the formations, thereby rendering the material artificially radioactive, and at an interval of time following the cessation of irradiation to measure this artificial radioactivity. The time is related to the half life of the activated material and is of the order of minutes or seconds for such of the common elements of the earth as are activated appreciably by this means. This may be accomplished by causing the source to be turned on and off at a frequency related to half life and detecting continuously or the detector may follow a continuously emitting neutron source through the well at such spacing and rate as to cause the detector to arrive at a particular point in the well a predetermined interval after irradiation. In the instant invention, the period of the periodically varying source and detector system is related not to the half life of the irradiated material but to the lifetime of the neutrons in the formations, that is, to the time needed for fast neutrons emitted from the source to be slowed and captured. This time is of the order of hundreds of microseconds in ordinary earth formations.

In the co-pending application of Arthur H. Youmans Ser. No. 292,927, filed July 5, 1963 and now U.S. Pat. No. 3,379,882, assigned to the assignee of the present invention, there is described a system for radioactivity well logging wherein the formations are irradiated with neutrons from a periodically varying source operating at a repetition rate of the order of magnitude of hundreds or thousands of cycles per second, being thus alternately on and off for periods of hundreds of microseconds. A detecting system is synchronized with the source to operate while the source is off. The radiation detected may be either slow neutrons or gamma rays which result from thermal neutron capture; in either case the signal is related to the population of thermal neutrons in the formation, surrounding the borehole. From the time the source is turned off, the slow neutrons are gradually captured and the amount of radiation detected per unit time decreases until the source is again turned on. By measuring the number of thermal neutrons (or gamma rays produced by the thermal neutrons) present at any particular time, the rate of decay of the thermal neutron population may be measured. The rate of decay is dependent upon the nuclei of the material present in the formations and varies from formation to formation. This rate of decay is related to the time required for those nuclei to capture the thermal neutrons; therefore, in the system described therein, the measurement is related to this time and hence to the lifetime of the neutrons in the formations. The radioactivity well log which is normally conducted according to the radioactivity well logging system described in said co-pending application comprises a pair of counting rate curves plus a curve indicative of the rate of decline of the neutron population which is a function of the ratio of the two counting rate curves. This curve is calibrated to record sigma, the thermal neutron capture cross section of the formation. The early gate, or $N_1$ curve is, in present commercial operation, normally derived during the interval of 400 to 600 microseconds after time zero; that is, it is a measure of the radiation intensity detected during the interval from 400 to 600 microseconds after the termination of the neutron pulse from the neutron source. The late gate, or $N_2$ curve, is a similar measurement derived during the interval from 700 to 900 microseconds after time zero. The present invention relates to an improvement upon the system as described in said co-pending application and as such comprises, broadly, means for deriving an indication of $N_0$, the hypothetical counting rate at time zero by extrapolation. There is also provided a third gate, $N_3$, and means for computing the background count from circuitry combining the information from the three gates.

Therefore, the principal object of this invention is to provide an improved method and apparatus for determining geophysical characteristics of formations about a borehole;

It is a further object of this invention to provide an improved method and apparatus for neutron well logging based on the lifetime of neutrons in the formations;

It is yet another object of the invention to provide means for deriving the extrapolated radiation counting rate at time zero;

It is still another object of the invention to provide means for computing and/or eliminating the effect of any counting rate due to activation radiation within the borehole, the formation being logged, or the radiation detector itself.

Other objects, features and advantages of the invention will become apparent from the following detailed descriptions, when considered with the accompanying drawings, in which:

Figure 1:
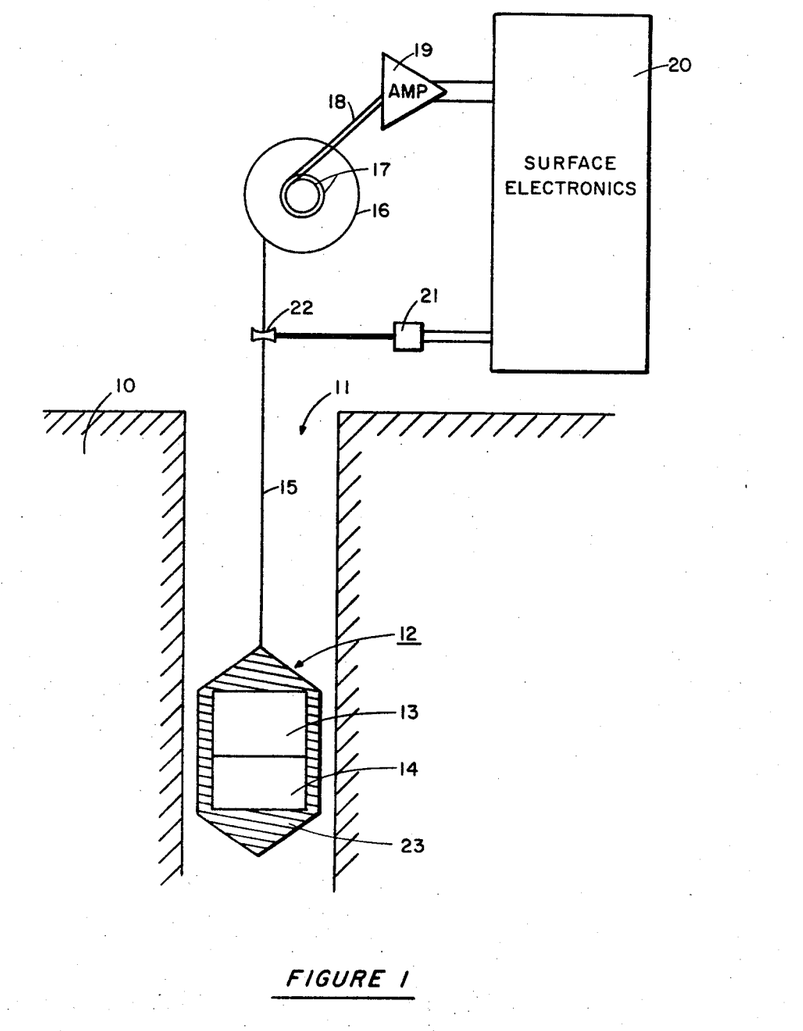
FIG. 1 is a side elevational view partly in section illustrating apparatus according to the invention, and the disposition of such apparatus relative to the strata to be examined.

Referring now to the drawings in detail, particularly to FIG. 1, there is illustrated schematically a radioactive well surveying operation in which a portion of the earth's surface 10 is shown in vertical section. A well 11 penetrates the earth's surface and may or may not be cased. Disposed within the well is subsurface instrument 12 of the well logging system. Subsurface instrument 12 comprises a detecting system 13 and a neutron source 14. Cable 15 suspends the instrument in the well and contains the required conductors for electrically connecting the instrument with the surface apparatus. The cable is wound on, or unwound from, drum 16 in raising and lowering the instrument 12 to traverse the well.

Figure 6A:
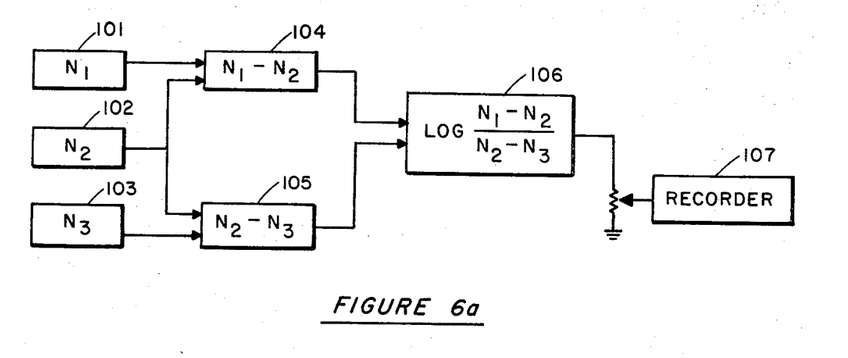
FIGS. 6a and 6b are block diagrams illustrating apparatus according to the invention for deriving the background radiation count.

In making a radioactivity log of a well, instrument 12 is caused to traverse the well. During the traversal, neutrons from source 14 irradiate the formations surrounding the borehole, and radiations influenced by the formations are detected by detecting system 13. The resultant signal is sent to the surface through cable 15. Through slip rings and brushes 17 on the end of the drum 16, the signals are conducted by lines 18 to the amplifier 19 for amplification. The amplified signal is conducted to the surface electronics 20. A recorder, for example, recorder 70 of FIG. 6, within the electronics section 20 is driven through a transmission 21 by measuring reel 22, over which cable 15 is drawn, so that the recorder 70 moves in correlation with depth as instrument 12 traverses the well. Amplifier 19 may be included in the subsurface instrument, or amplification may be effected both on the surface and in the subsurface instrument. It is also to be understood that the instrument housing 23 is constructed to withstand the pressures and mechanical and thermal abuses encountered in logging a deep well.

As is well known in the art of radioactivity well logging, the formation 10 is irradiated by neutrons from the neutron source 14, for example, a D-T accelerator. These neutrons participate in elastic and inelastic collisions with the atoms contained in the various layers of the formation. The secondary radiation resulting from bombardment by the primary radiation in the form of neutrons from the source 14 is detected by the radiation detector 13.

The measurement of the decline of the thermal neutron population provides a means for determining a property of the material surrounding the borehole which is a definite, calculable, physical parameter, the macroscopic capture cross section of the formation.

A simple relationship exists between the measured "lifetime" of a formation and its chemical composition. To derive this relation, it is first necessary to define neutron lifetime. For this purpose, it is defined as L, the time required in a given medium for the total number of thermal neutrons existing at any instant to fall to half value. Thus, L is a quantity which is analogous to the half life of radioactive materials.

Just as with radioactive decay, the number of neutrons captured per unit time is proportional to the number of neutrons present. The total number of neutrons in the formation as a function of time can be generally expressed by a formula as follows:

$$n = n_o e^{-\Sigma vT} \qquad (1)$$

Where $n$ is the number of neutrons at any time $T$, $n_o$ is the number of neutrons at time $T = 0$; $V$ is the velocity of thermal neutrons, being a constant, and $\Sigma$ is the macroscopic thermal neutron capture cross section. $\Sigma$ differs for different formation materials, and can easily be calculated if the chemical composition is known.

In a logging operation, the number of neutrons $n$ in the formation at any time $T$ cannot be measured directly, but a number $N$ approximately proportional to $n$ can be measured with the radiation detector as previously described. The equation $N = N_o e^{-\Sigma vT}$ expresses the relation between the instantaneous counting rate $N$ observed at any time $T$ where $N_o$ is a hypothetical quantity obtained by measuring a value of $N$ at two different values of $T$, for example, $N_1$ and $N_2$, and deriving $N_o$ by extrapolating a line through $N_2$ and $N_1$ until it intersects the line representative of $T = c8$ 0. Thus $N$ may be referred to as the counting rate at time zero, although in fact no direct measurement of the quantity is possible, and if the detector were actuated at time zero it would not measure $N_o$. This is true because at time zero, the neutron source is emitting an intense burst of neutrons which produces many radiations, the result being that $N_o$ could not be measured to the exclusion of such radiations. For this reason $N_o$ may only be derived as herein disclosed.

Figure 2:
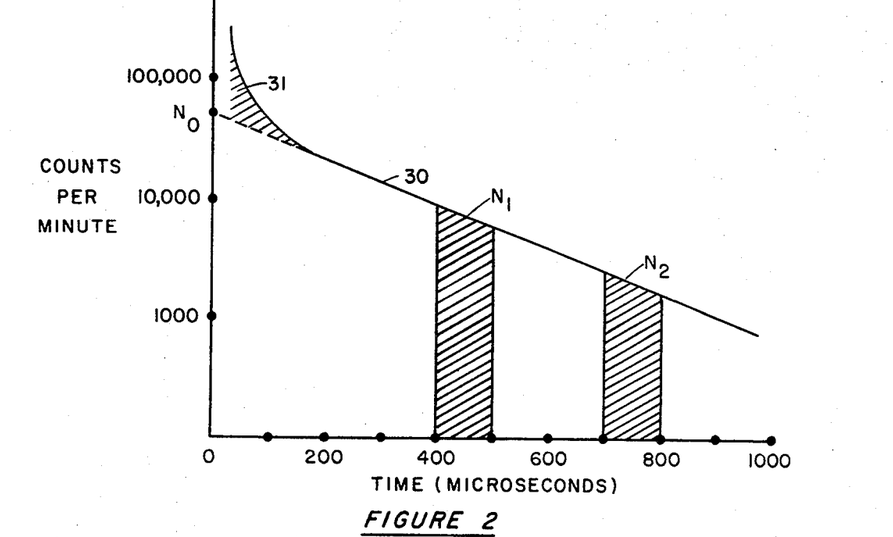
FIG. 2 is a schematic representation of the characteristic decay of the thermal neutron population following a burst of fast neutrons within a well.

In order to make a quantitative measurement of an unknown formation fluid in a logging operation, the slope of the radiation decay curve, for example, curve 30 in FIG. 2, must be determined. To do this, as is done in the aforementioned co-pending application, the logging instrument is arranged so that two separate measurements are made during each cycle, the first at a time $T_1$ after the neutron source pulse and the second at a later time $T_2$.

At times $T_1$ and $T_2$, the counting rates $N_1$ and $N_2$, respectively, are given by the following relation derived from equation 1:

$$ln(N_2/N_1) = -\Sigma V(T_2 - T_1)$$

If we take $T_2 - T_1$ equal to 600 microseconds, for example, then $$ln\,(N_2/N_1) = -132\Sigma$$

$$(N_2/N_1) = e - 132\Sigma$$

so in the case of salt water sand where $\Sigma$ is computed to be 0.0269, $$(N_2/N_1) = e^{-3.55} = 0.029$$

but for the fresh water sand where $\Sigma = 0.0099$, $$(N_2/N_1) = e^{-1.29} = 0.275$$

In logging, the observed deflections of the two recorded curves are proportional to $N_1$ and $N_2$, respectively. If desired, the two curves may be normalized so that they produce equal log deflections in a fresh water sand. In the example given, it can be seen that the salt water sand would not produce equal deflections but two deflections differing by a factor $(0.275/0.029) = 9.5$. In other words, when logging through these two formations, the log response could be set up in one zone so as to give the same deflections for both curves, whereupon in the other zone, the two deflections would differ by 950 percent. An even bigger differential would result if the interval $T_2 - T_1$ were chosen larger, for example 900 microseconds, in which case the two curves would differ in the relative response to these particular zones per factor of 2,900 percent.

The technique described of comparing the relative counting rates in two separate gates during the quiescent period between pulses has been found to be a generally satisfactory means for a quantitative evaluation of the decline of the thermal neutron population. Depending on lithologic conditions, the duration and timing of the gates may be chosen in various ways to achieve the desired result.

The improvement according to the present invention in the above-described methods and apparatus comprises, broadly, the provision of three gated detection intervals following each neutron source pulse. There is also provided apparatus for determining $N_o$, the counting rate at time zero relative to a neutron source pulse.

FIG. 2 illustrates a counting rate curve 30 which is exemplary of the decline of the thermal neutron population following each neutron source pulse. The region 31 of the curve is influenced by the borehole and the fluids, casing, and other materials therein which generally result in a more rapid capture of the neutrons in the borehole than of those in the formation surrounding the borehole. For this reason region 31 of the decline curve is not accurately representative of the formation characteristics. Accordingly, no measurement is made during this time interval. In the case of most potentially productive reservoir rocks, the region 31 does not extend into the interval $N_1$ and therefore the measurement of $N_1$ and $N_2$ provides a means for determining the characteristics of the formation without influence due to the presence of the borehole. The counting rates $N_1$ and $N_2$ are taken, respectively, during the periods of 400–500 and 700–800 microseconds after each neutron pulse. However, such times are merely illustrative of providing two gated detection intervals during the decline of the thermal neutron population.

Figure 3:
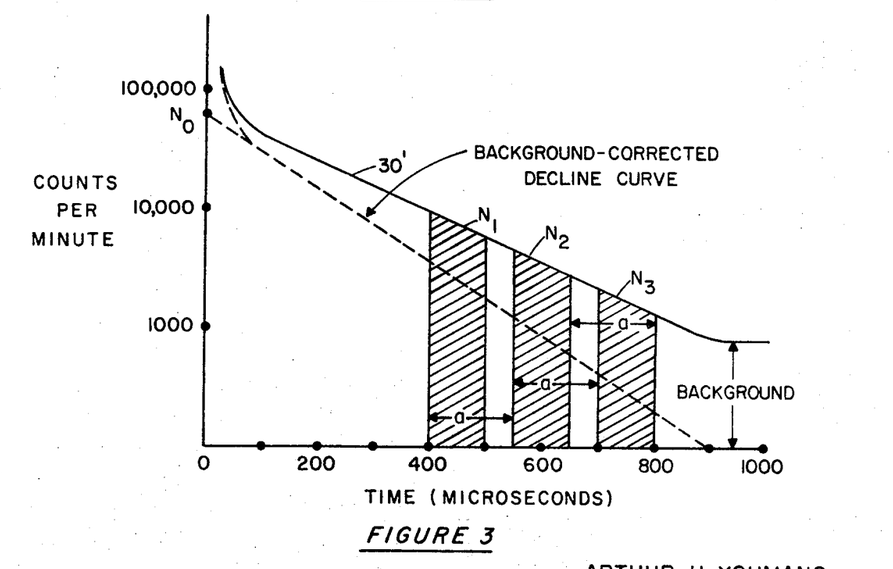
FIG. 3 is a schematic representation of three gated intervals within the thermal neutron decay curve according to the invention.

FIG. 3 illustrates the curve 30', similar to curve 30 in FIG. 2, but having three gated detection intervals with respective counting rates $N_1$, $N_2$ and $N_3$. FIG. 3 depicts the observed effect when a "background" is present. This background may, for example, be due to the detection of gamma rays resulting from $N^{16}$ induced in the rocks and borehole fluids by interaction with neutrons from the source. Since $N^{16}$ is a radioactive isotope with a half life of 7.3 seconds, it is present in substantially equal abundance throughout the measurement cycle and as such constitutes an effectively constant background. Similarly, artificial radioactivity may be induced in the scintillation crystal itself or in other elements of the borehole or formations. When the radiation detector responds to these radiations, either by design or inadvertently, the observed slope of the decay curve 30' of FIG. 3 is different from the true slope which would be observed in the absence of such background. It is one object of the present invention to determine the true slope of the decay curve of the neutron population despite the presence of background radiation. As will be more fully described, this can be accomplished by measuring during each of three gates $N_1$, $N_2$ and $N_3$ as depicted in FIG. 3.

It is to be understood, however, that the time periods for the three gated intervals are for purposes of illustration only and are not to be construed as limiting the invention.

Figure 4:
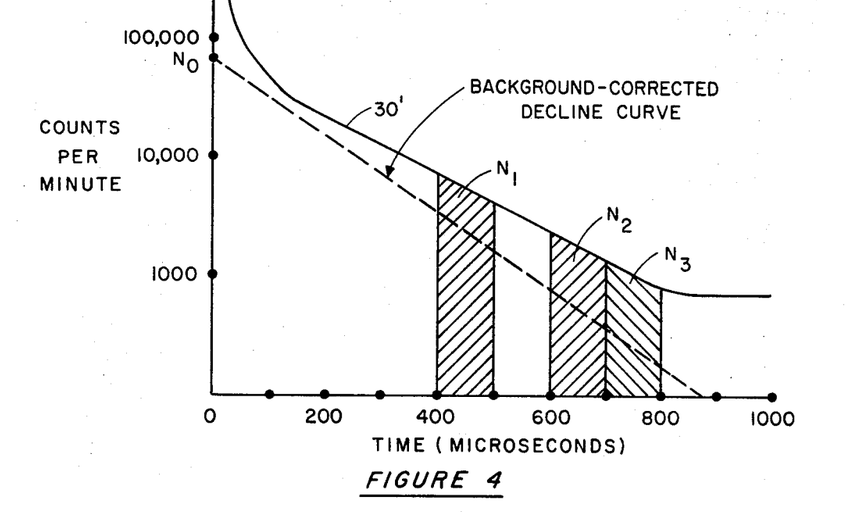
FIG. 4 is a schematic representation of an alternative embodiment of the invention wherein two of the three intervals as illustrated in FIG. 3 are contiguous.

FIG. 4 illustrates a curve 30', as in FIG. 3, but having contiguous detection intervals for the counting rates $N_2$ and $N_3$.

Figure 5:
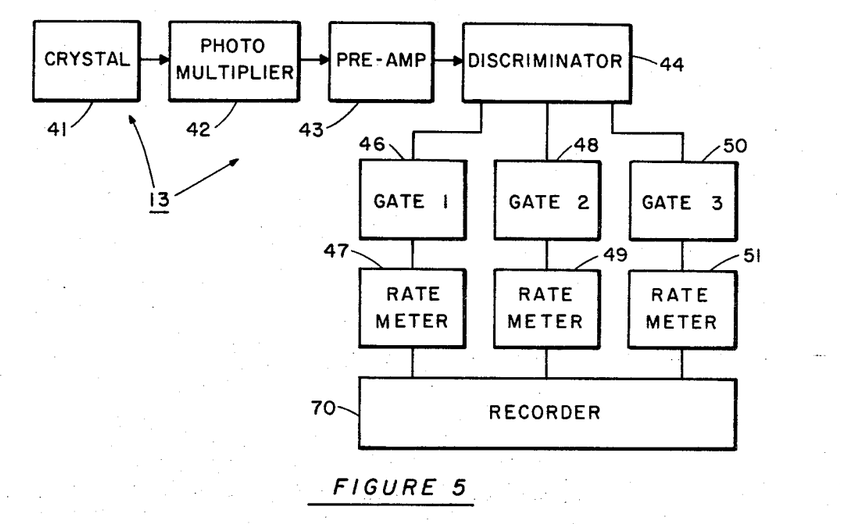
FIG. 5 is a block diagram illustrating apparatus according to the invention for providing three gated detection intervals following each neutron pulse.

FIG. 5 illustrates the radiation detection system 13 in block diagram. A crystal 41, for example CsI or NaI, can be used as a scintillation crystal. LiI, a neutron detector, is also acceptable. For purposes of this apparatus and circuitry, however, it is desirable that the crystal used have an output proportional to the energy of a gamma ray photon received. A crystal of this type emits a photon of light energy when a gamma ray photon impinges upon it, and the energy of the light photon is proportional to the energy of the incoming gamma ray photon.

The scintillation from the crystal 41 is coupled to the photomultiplier tube 42 which produces electrical pulses proportional to the intensity of the light produced by the crystal. The crystal 41 and photomultiplier 42 can be fabricated, if desired, according to U.S. Pat. No. 3,254,217 to Arthur H. Youmans. These pass to the pre-amplifier conventional stage 43. The preamplifier 43 is connected to the discriminator 44 which is set to respond to pulses of a preselected magnitude. It should be appreciated that the discriminator 44 forms no part of the invention, and while being a part of the preferred embodiment, could be adjusted to accept pulses in any portion of the McGraw-Hill If desired, the discriminator 44 can be built in accordance with FIG. 4.1, page 204 of Electronics, Experimental Techniques, Elmore and Sands, published by the McGraw Hill Book Company, Inc. in 1949.

The gates 46, 48, and 50, respectively, for example, built in accordance with gating circuitry such as is depicted in U. S. Pat. No. 3,358,142 to Eric C. Hopkinson et al. connect the discriminator 44 output to conventional counting rate meters 47, 49, and 51, the outputs of which may be connected to a recorder 70. If desired the counting rate meters 47, 49 and 51 can be constructed in accordance with FIG. 3 of U. S. Pat. No. 3,538,329 to Francis J.

Niven, Jr. The recorder 70 is conventional, for example, a film strip recorder. Gates 1, 2, and 3 (elements 46, 48, and 50) are synchronously driven by signals from the neutron source 14 to provide predetermined gating intervals, for example, like those illustrated in FIGS. 3 and 4.

If desired, one of the gates, for example, gate 2, could have a time duration twice that of gate 1, and thus produce contiguous regions such as $N_2$ and $N_3$ of FIG. 4 without the provision of a third gate per se.

From the basic equation, above discussed, $$N = N_o e^{-\Sigma VT} \quad (1)$$

it can be shown that the counting rates for gates 1, 2 and 3 are given by $$N_1 = \frac{KN_o}{\Sigma} e^{-\Sigma VT_{11}} [1 - e^{-\Sigma V_g}] + Bg \quad (2)$$

$$N_2 = \frac{KN_o}{\Sigma} e^{-\Sigma VT_{21}} [1 - e^{-\Sigma V_g}] + Bg \quad (3)$$

$$N_3 = \frac{KN_o}{\Sigma} e^{-\Sigma VT_{31}} [1 - e^{-\Sigma V_g}] + Bg \quad (4)$$

where $K$ is a constant, $g$ is the gate width, $B$ is the background counting rate, and $T_{11}$, $T_{21}$ and $T_{31}$ are the respective beginning times of the three gates.

From equations 2, 3, and 4, providing $g$ is constant, $$\Sigma = \frac{1}{VA} \cdot \ln \frac{N_1 - N_2}{N_2 - N_3} \quad (5)$$

where $a$ is the gate spacing as shown in FIG. 3.

FIG. 6a shows in block form the means for deriving $\Sigma$ in a logging operation. In the figure, blocks 101, 102, and 103 represent the output of counting rate meters responsive, respectively, to the radiation induced pulses detected during gates $N_1$, $N_2$ and $N_3$. Block 104 represents a subtraction circuit which derives a signal proportional to $N_1 - N_2$. Block 105 derives a signal proportional to $N_2 - N_3$. Such subtraction circuits are conventional, for example as are found in chapter 5 of Electronic Analog Computers by Korn and Korn, published by the McGraw-Hill Book Company in 1956. Block 106 represents circuits means which derives a signal proportional to the logarithm of $$\frac{N_1 - N_2}{N_2 - N_3}$$

The circuit for providing such a logarithmic signal is described in U. S. Pat. No. 3,534,401 to P. H. Karvellas et al. Block 107 represents a recorder where a signal proportional to the output of 106 is recorded in correlation with depth of the logging instrument. Such recorders are conventional, for example a strip chart recorder. It is to be understood that this recorded signal will be adjusted in magnitude so as to provide a recorded indication of variations in $\Sigma$ in accordance with a preselected calibration scale. For example, in borehole logging it has been observed that $\Sigma$ generally has a value between about $10^{-2}$ cm$^{-1}$ and $10^{-1}$ cm$^{-1}$. A suitable scale has been found to be one whereby the output of block 106 is so adjusted that the recorder responds with maximum deflection for a $\Sigma$ value of $10^{-2}$ cm$^{-1}$, and with minimum deflection for a $\Sigma$ value of $5 \times 10^{-2}$ cm$^{-1}$.

Referring again to equations 2, 3 and 4, let $$\overline{N_o} = KN_o / \Sigma$$

$$N_1 = \overline{N_o} e^{-\Sigma VT_{11}} [1 - e^{-\Sigma V_g}] + Bg \quad (6)$$

$$N_2 = \overline{N_o} e^{-\Sigma VT_{21}} [1 - e^{-\Sigma V_g}] + Bg \quad (7)$$

$$N_3 = \overline{N_o} e^{-\Sigma VT_{31}} [1 - e^{-\Sigma V_g}] + Bg \quad (8)$$

Since $$N_2 e^{\Sigma V_a} - N_1 = Bg(e^{\Sigma V_a} - 1)$$

$$B = \frac{1}{g} \cdot \frac{N_2 e^{\Sigma V_a} - N_1}{e^{\Sigma V_a} - 1} \quad (9)$$

Figure 6B:
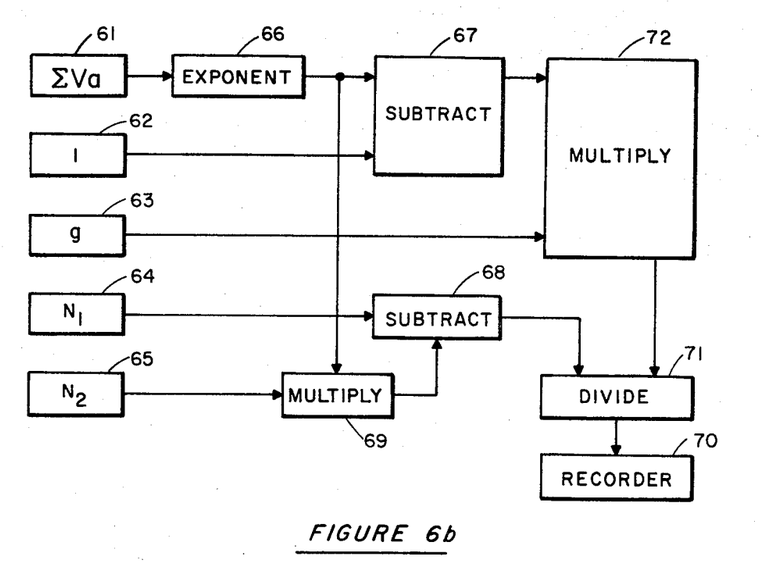

FIG. 6b illustrates in block diagram the circuitry for providing the background B according to equation 9. It should be appreciated that the diagrammatical cuicuit blocks shown in FIGS. 6b, 7a circuit and 7b are conventional. If desired, such circuits can be built as shown in Electronic Analog Computers by Korn and Korn, published by the McGraw-Hill Book Company in 1956. By way of specific example, the "exponent" circuits 66, 81 and 88 can be built in accordance with example No. 4.5 of table No. 4 on page 423 of that reference. Likewise, the divide circuits 71, 89 and 90 can be built in accordance with chapter 6, page 339 of that same reference. As previously discussed, the subtraction circuits are discussed in chapter 5 under the heading of "Differential Amplifiers" and the multiplier circuits are set forth in detail in chapter 6 of that same reference. The "1" and "9" circuits are also conventional circuits for generating constant voltages, such as, for example, batteries or constant voltage power supplies. Because of the relationship in equation 5, $\Sigma Va$ is, for a given gate spacing, proportional to $\Sigma$, which is a function of the three counting rates $N_1$, $N_2$ and $N_3$ as described in the foregoing. The $\Sigma Va$ signal may be derived, for example, from a circuit such as FIG. 6a and is coupled from block 61 through exponential circuitry 66, through subtraction circuitry 67 and into the multiplication circuitry 72. The "1" circuitry 62 is also coupled into the subtraction circuit 67 whereby one of the signals coupled from block 67 to block 72 is $e^{\Sigma Va} - 1$. The other signal coupled into the block 72 is from the $g$ circuitry 63. The $N_1$ counting rate from the block 64 is coupled into the subtract block 68. The $N_2$ counting rate from the block 65 is multiplied in block 69 by $e^{\Sigma Va}$ coupled from block 66. The outputs from block 68 and block 72 are coupled into the divide block 71 and then into the recorder 70, thus providing a recorded indication of the background count $B$ of equation 11 as a function of the depth of the borehole.

Referring again to FIG. 2, $N_o$ may be described as the counting rate which appears to have occurred at time $T = 0$ and which may be inferred by graphically extending curve 30 to the point where it intersects the $T = 0$ axis. Since $N_o$ varies with variations in formation porosity, as well as other borehole and formation characteristics, it is a useful parameter to measure. It has been discovered that $N_o$ can be ascertained by utilization of the circuitry and relationships hereinafter described. Since, $$N_1 - N_2 = \overline{N_o}(e^{-\Sigma VT_{11}} - e^{-\Sigma VT_{21}})(1 - e^{-\Sigma V_g}) \quad (10)$$

$$N_1 - N_2 = \overline{N_o} e^{-\Sigma VT_{11}}(1 - e^{-\Sigma V_g})(1 - e^{-\Sigma V_a}) \quad (11)$$

However, $e^{-\Sigma VT_{11}}(1 - e^{-\Sigma V_g})$ can be approximated by the expression $e^{-\Sigma VT_0}$, where $T_0 = T_{11} + g/2$. Thus, $$\overline{N_0} = \frac{(N_1 - N_2)e^{\Sigma VT_0}}{1 - e^{-\Sigma V_a}} \quad (12)$$

Recalling that $$\overline{N_0} = \frac{KN_0}{\Sigma}$$

it follows that $$N_0 = \frac{\Sigma}{K} \frac{(N_1 - N_2)e^{\Sigma VT_0}}{1 - e^{-\Sigma VA}} \quad (13)$$

Figure 7A:
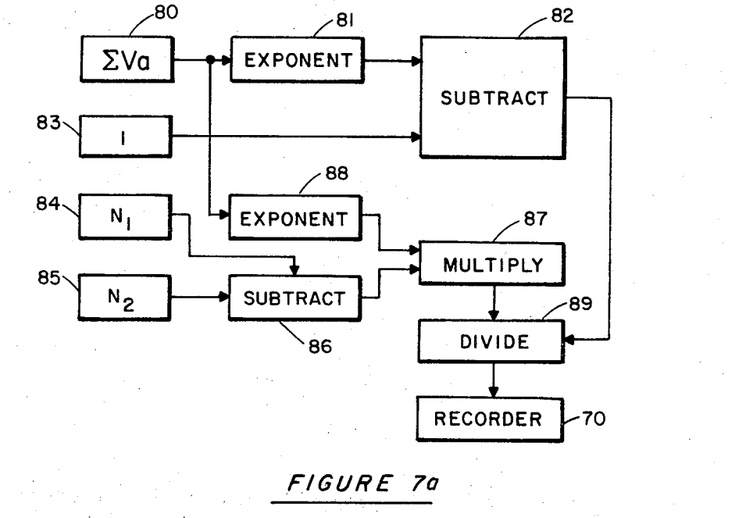
FIGS. 7a and 7b are block diagrams of apparatus according to the invention for deriving the extrapolated radiation counting rate at time zero.

FIG. 7a illustrates the circuitry for producing $\overline{N_0}$. The $\Sigma Va$ signal is coupled from block 80 to the exponent circuitry 81 and then to the subtraction block 82. A "1" function from block 83 is also coupled into the subtract block 80, thus producing the function $1 - e^{-\Sigma^{Va}}$. The $N_1$ counting rate is coupled from block 84 and the $N_2$ counting rate is coupled from block 85 to the subtract circuitry 86, the output of which is connected to the multiplication circuitry 87. The $\Sigma Va$ signal is also coupled through the exponent circuit 88 into the block 87. The output of the multiplication block 87 is combined in the division circuit 89 to provide the complete expression $$\overline{N_0} = \frac{(N_1 - N_2)e^{\Sigma VT_0}}{1 - e^{-\Sigma Va}}$$

which may be recorded on recorder 70 as a function of the depth in the borehole.

The quantity $\overline{N_o}$ may be preferred to the quantity $N_o$ in the case where a gamma ray detector is employed to produce the measurements $N_1$, $N_2$ and $N_3$. This arises from the fact that the intensity of gamma radiation observed at any instant is proportional to the rate of capture of the neutron population. This rate of capture is of course proportional to $\Sigma$, the thermal neutron capture cross section. Thus since $N_o$, $N_1$, $N_2$ and $N_3$ are quantities proportional to the gamma ray intensity at the respective times of measurement, $N_o/\Sigma$, $N_1/\Sigma$, $N_2/\Sigma$ and $N_3/\Sigma$ are quantities proportional to the thermal neutron populations at the corresponding times. Accordingly, it may be desired to derive and record the quantity $\overline{N_o}$ as in the foregoing.

Figure 7B:
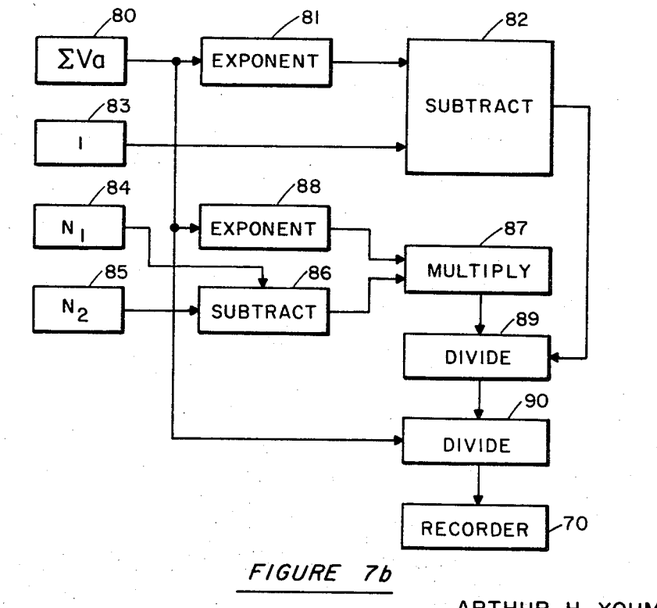

On the other hand, the quantity $N_o$ may be derived as in FIG. 7b. As may be seen from the block diagram, the derivation of $N_o$ comprises the step of dividing $\overline{N_o}$ by a quantity proportional to $\Sigma$ prior to recording it as a function of depth, the additional division taking place within the divide circuit 90.

It should be appreciated that in the foregoing description of the derivation of $N_o$ and $\overline{N_o}$, it is assumed that the intensity of the neutron source remains constant. If variations in source output occur, corresponding variations in $N_1$, $N_2$ and $N_3$ will occur and hence $N_o$ and $\overline{N_o}$ will respond proportionately to these variations.

It should be understood that the effect of these variations may be eliminated by constantly deriving a signal $M$ proportional to the neutron source strength and employing this signal $M$ to correct for any observable effects due to such variations. This might be accomplished, for example, by deriving the respective quantities $N_1' = N_1/M$, $N_2' = N_2/M$ and $N_3' = (N_3/M)$. These quantities $N_1'$, $N_2'$ and $N_3'$ might then be employed instead of $N_1$, $N_2$ and $N_3$ in the foregoing computations in order to eliminate the effect of neutron source output variations. Alternatively, when the quantities $N_o$ or $\overline{N_o}$ are derived, these respective quantities may be corrected for variations in source output by dividing by $M$.

In the case when no background exists, the quantity $N_o$ can be derived with only two gate measurements, e.g. $N_1$ and $N_2$ in accordance with the following general formula, $$\ln N_o = \Sigma VT_1 + \ln N_1$$

where $N_1$ is the counting rate at $T_1$.

It will be appreciated that in actual practice the counting rate $N_1$ is averaged over an appreciable interval, e.g. 100 microseconds and the time $T_1$ must be selected at some time during the interval, say midway in the measuring interval. Thus the formula is mathematically exact only for cases where the gate duration is short compared to the mean lifetime of the neutron population. Those skilled in the art will appreciate that an exact formula can be derived for use in such applications as justify the attendant increase in complexity of the instrumentation required to derive $N_o$.

An alternative embodiment may be employed in the case where the first gate begins at $T = 400$ microseconds and the second gate begins at 800 microseconds. In this case the formula relating $N_o$ to the measured parameters is $$N_o = N_1^2/N_2)$$

When it is further desired to correct this value for variations in neutron source output, if any, the formula becomes $$N_o = (N_1^2/N_2) \cdot (1/M)$$

where $M$ is proportional to the neutron source output and may be provided by a monitor detector associated with the neutron source.

It should be appreciated that not only $N_o$, but also other values of $N$, may be derived, wherein the latter may be extrapolated to times other than zero. For example, the value of $N$ at $T = 30$ microseconds, $-30$ microseconds, or 100 microseconds may be derived by techniques analogous to the foregoing method and apparatus described in detail for the case where $T = 0$.

It should thus be appreciated that there has been described herein a radioactivity well logging apparatus and method for measuring the thermal neutron capture cross section of formations, for computing the radiation background count within a well bore, as well as for computing the neutron count at time zero. However, modifications of this invention other than these herein suggested will become apparent to those of ordinary skill in the art after reading this disclosure. For example, although not illustrated, the gating and related circuitry could be either in the borehole instrument or in the surface electronics. Likewise, while two and three gate embodiments have been described, it should be appreciated that those in the art might modify the invention to include four or more gates. Therefore, it is intended that the matter contained in the foregoing description and the accompanying drawings be interpreted in an illustrative sense, and not in a limiting sense, when consideration is given to the appended claims.

The embodiments of the invention in which an exclusive property or privilege is claimed are defined as follows:

1. A system for radioactivity well logging comprising a source of neutrons, radiation detection means in a spaced relationship to said source, said detection system including at least a first and second gate, means for causing said source to produce a discrete burst of neutrons and for triggering said gates to provide an indication functionally representative of the rate of decline of at least a portion of said neutrons in a medium, means for combining the outputs of said gates to provide a signal directly proportional to the neutron counting rate at time zero following said neutron burst, and means for recording said indication of the neutron counting rate as a function of depth within the well.

2. The system according to claim 1 including means for recording said indication of the rate of decline of the neutrons within a medium as a function of depth within a well.

3. The system according to claim 1, including neutron source monitoring means connected to said means for combining the outputs of said gates, wherein said indication of the neutron counting rate at time zero is recorded as a function of the strength of said neutron burst.

4. The system according to claim 1, wherein said means for combining the outputs of said gates to provide an indication of the neutron counting rate at time zero comprises circuitry for solving the equation for $N_o$, wherein $$N_o = \frac{(N_1 - N_2) e^{\Sigma V T_o}}{1 - e^{-\Sigma V a}}$$

where $N_o$ = the neutron counting rate at time zero, $N_1$ = the first gate counting rate, $N_2$ = the second gate counting rate, $\Sigma$ = the thermal neutron capture cross section, $V$ = velocity of neutrons, $T_o$ = starting time of the first gate after time zero plus the gate width, and $a$ = spacing between the gates.

5. The system according to claim 1 wherein said means for combining the outputs of said gates to provide an indication of the neutron counting rate at time zero comprises circuitry for solving the equation for $N_o$, wherein $$N_o = (N_1^2 / N_2) \cdot (1/M)$$

wherein $N_o$ = the neutron counting rate at time zero, $N_1$ = the first gate counting rate, $N_2$ = the second gate counting rate, and $M$ is a function of the neutron burst strength.

* * * * *